United States Patent
Locker et al.

(10) Patent No.: US 9,569,164 B2
(45) Date of Patent: Feb. 14, 2017

(54) CENTRAL DISPLAY WITH PRIVATE SECONDARY DISPLAYS

(75) Inventors: Howard J. Locker, Cary, NC (US); James Stephen Rutledge, Durham, NC (US); Aaron Michael Stewart, Raleigh, NC (US); John David Swansey, Durham, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 741 days.

(21) Appl. No.: 13/047,389

(22) Filed: Mar. 14, 2011

(65) Prior Publication Data

US 2012/0235922 A1 Sep. 20, 2012

(51) Int. Cl.
*G06F 3/14* (2006.01)
*G09G 5/14* (2006.01)

(52) U.S. Cl.
CPC ............. *G06F 3/1462* (2013.01); *G09G 5/14* (2013.01); *G09G 2370/02* (2013.01)

(58) Field of Classification Search
USPC ........................................... 345/1.1–3.4, 173
See application file for complete search history.

(56) References Cited

U.S. PATENT DOCUMENTS

| | | | |
|---|---|---|---|
| 2006/0068879 A1* | 3/2006 | Crawford et al. | 463/17 |
| 2008/0229202 A1* | 9/2008 | Fang et al. | 715/716 |
| 2009/0098932 A1* | 4/2009 | Longway | 463/22 |
| 2009/0160731 A1* | 6/2009 | Schuler | G06F 3/1423 345/1.1 |
| 2010/0289900 A1* | 11/2010 | Ortiz | 348/159 |
| 2011/0065459 A1* | 3/2011 | Cheng et al. | 455/457 |

* cited by examiner

*Primary Examiner* — Amare Mengistu
*Assistant Examiner* — Sarvesh J Nadkarni
(74) *Attorney, Agent, or Firm* — Kunzler Law Group

(57) ABSTRACT

An apparatus, system, and method for a central display with private secondary displays. The apparatus includes a central information handling device and a secondary generation module. The central information handling device generates a central image for a central display. The central display is in communication with a plurality of secondary devices communicating with a plurality of secondary displays. Each secondary device communicates with a distinct secondary display. The secondary generation module generates a secondary image for two or more of the secondary displays of the secondary devices. The central display is viewable concurrently by users of each secondary display.

14 Claims, 5 Drawing Sheets

CENTRAL DISPLAY WITH PRIVATE SECONDARY DISPLAYS

FIELD

The subject matter disclosed herein relates to electronic displays and more particularly relates to a central display with private secondary displays.

BACKGROUND

Description of the Related Art

Computing devices and displays have decreased in size such that many computing devices, such as tablet personal computers ("PC"s), Smartphones, and the like, have combined a display and computer, providing users with a portable, private computing device and display. Moreover, with the proliferation of wireless communication formats such as wireless local area network ("WLAN"), Bluetooth, 3G and others, computing devices may communicate with one another in a variety of formats for a variety of purposes allowing greater user interaction.

Furthermore, larger, central displays are often used to display information to multiple users for presentations, gaming, and the like. However, the information on the central display is typically available to each user in the proximity.

BRIEF SUMMARY

Based on the foregoing discussion, the inventors have recognized a need for an apparatus, system, and method that generates a central image for a central display and that generates a secondary image for secondary displays. Beneficially, such an apparatus, system, and method would allow the central display to be viewable concurrently by users of each secondary display.

The embodiments of the present invention have been developed in response to the present state of the art, and in particular, in response to the problems and needs in the art that have not yet been fully solved by currently available displays. Accordingly, the embodiments have been developed to provide a method, apparatus, and system for a central display with private secondary displays that overcome many or all of the above-discussed shortcomings in the art.

One embodiment of an apparatus for a central display with private secondary displays is provided with a plurality of modules configured to functionally execute the necessary steps of generating a central image and generating a secondary image. These modules in the described embodiments include a central information handling device and a secondary generation module.

The central information handling device generates a central image for a central display. The central information handling device may be in communication with a plurality of secondary devices communicating with a plurality of secondary displays. Each secondary device may communicate with a distinct secondary display. The secondary generation module generates a secondary image for two or more of the secondary displays of the secondary devices. The central display may be viewable concurrently by users of each secondary display.

One embodiment of a method is provided for a central display with private secondary displays. The method in the disclosed embodiments substantially includes the steps necessary to carry out the functions presented above with respect to the operation of the described apparatus. The method includes generating a central image for a central display. The central display may be in communication with a central information handling device. The central information handling device may be in communication with a plurality of secondary devices communicating with a plurality of secondary displays. Each secondary device may communicate with a distinct secondary display. The method also includes generating a secondary image for two or more of the secondary displays of the secondary devices. The central display may be viewable concurrently by users of each secondary display.

One embodiment of a computer program product is also provided for a central display with private secondary displays. The computer program product includes generating a central image for a central display by way of a central generation module. The central generation module may be in communication with a plurality of secondary devices communicating with a plurality of secondary displays. Each secondary device may communicate with a distinct secondary display. The computer program product may also include generating a secondary image for two or more of the secondary displays of the secondary devices. The central display may be viewable concurrently by users of each secondary display.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
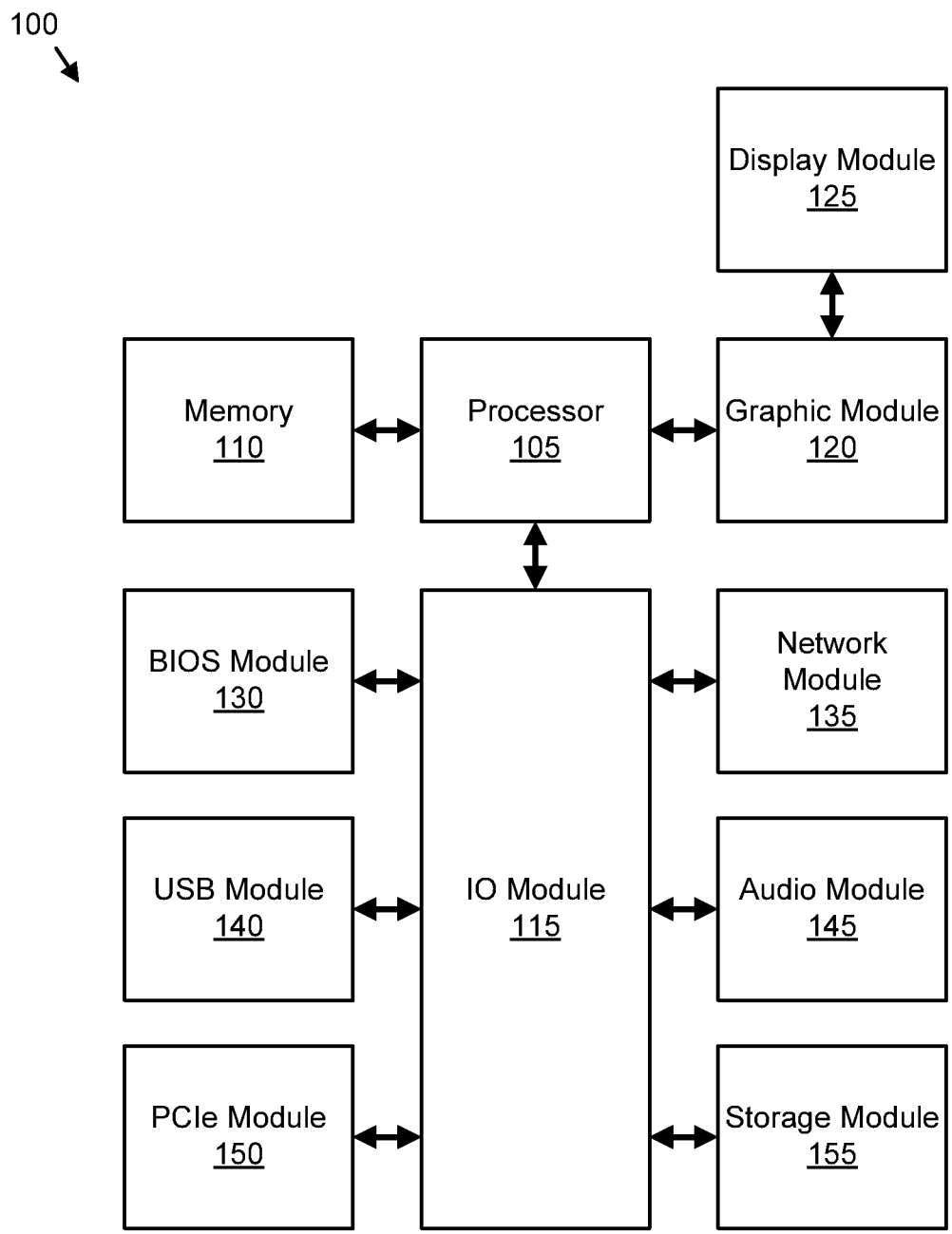
FIG. 1 is a schematic block diagram illustrating one embodiment of a computing system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a schematic block diagram illustrating one embodiment of a computing system 100. The computing system 100 includes a processor 105, a memory 110, an IO module 115, a graphics module 120, a display module 125, a basic input/output system (BIOS) module 130, a network module 135, a universal serial bus (USB) module 140, an audio module 145, a peripheral component interconnect express (PCIe) module 150, and a storage module 155. One of skill in the art will recognize that other configurations of a computing device 100 or multiple computer systems 100 may be employed with the embodiments described herein.

The processor 105, memory 110, IO module 115, graphics module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device (SSD). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS module 130, the network module 135, the PCIe module 150, and the storage module 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the IO module 115 to boot the computing device 100, so that computer readable software instructions stored on the storage module 155 can load, execute, and assume control of the computing device 100. Alternatively, the BIOS module 130 may comprise a coded program embedded on a chipset that recognizes and controls various devices that make up the computing device 100.

The network module 135 may communicate with the IO module 115 to allow the computing device 100 to communicate with other devices over a network. The devices may include routers, bridges, computers, printers, and the like. The display module 125 may communicate with the graphic module 120 to display information. The display module 125 may be a cathode ray tube (CRT), a liquid crystal display (LCD) monitor, or the like. The USB module 140 may communicate with one or more USB compatible devices over a USB bus. The audio module 145 may generate an audio output.

Figure 2:
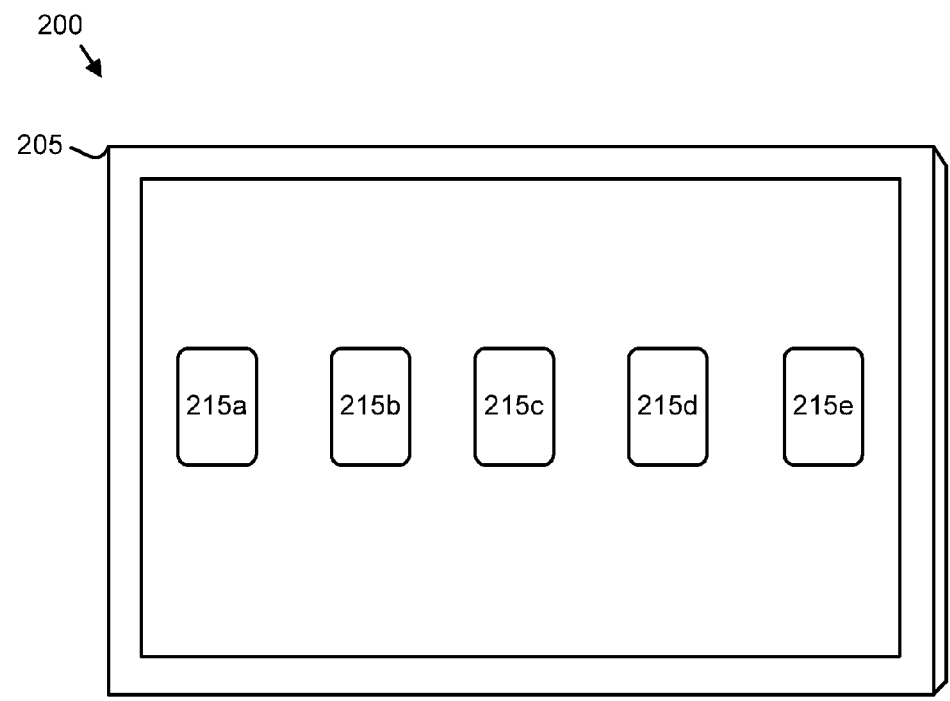
FIG. 2 is a schematic block diagram illustrating one embodiment of a system for a central display with private secondary displays.
Figure 2:
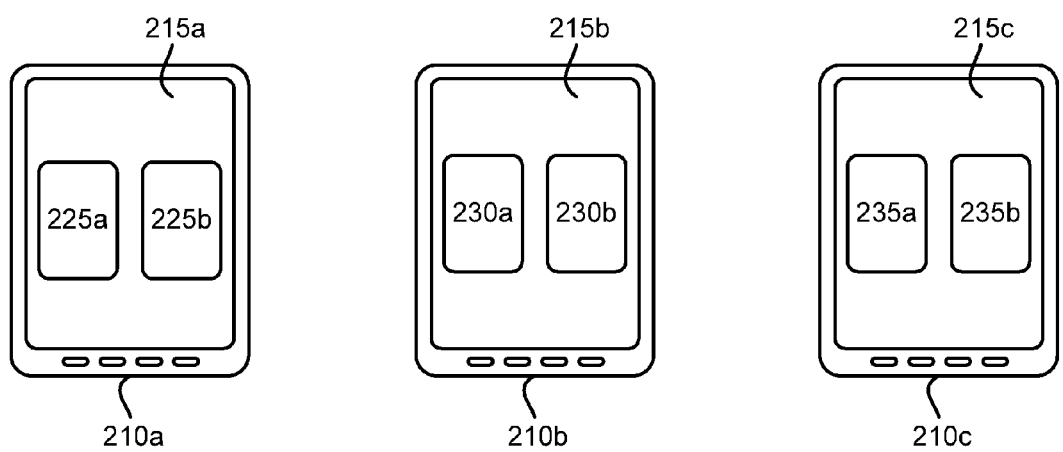
Figure 3:
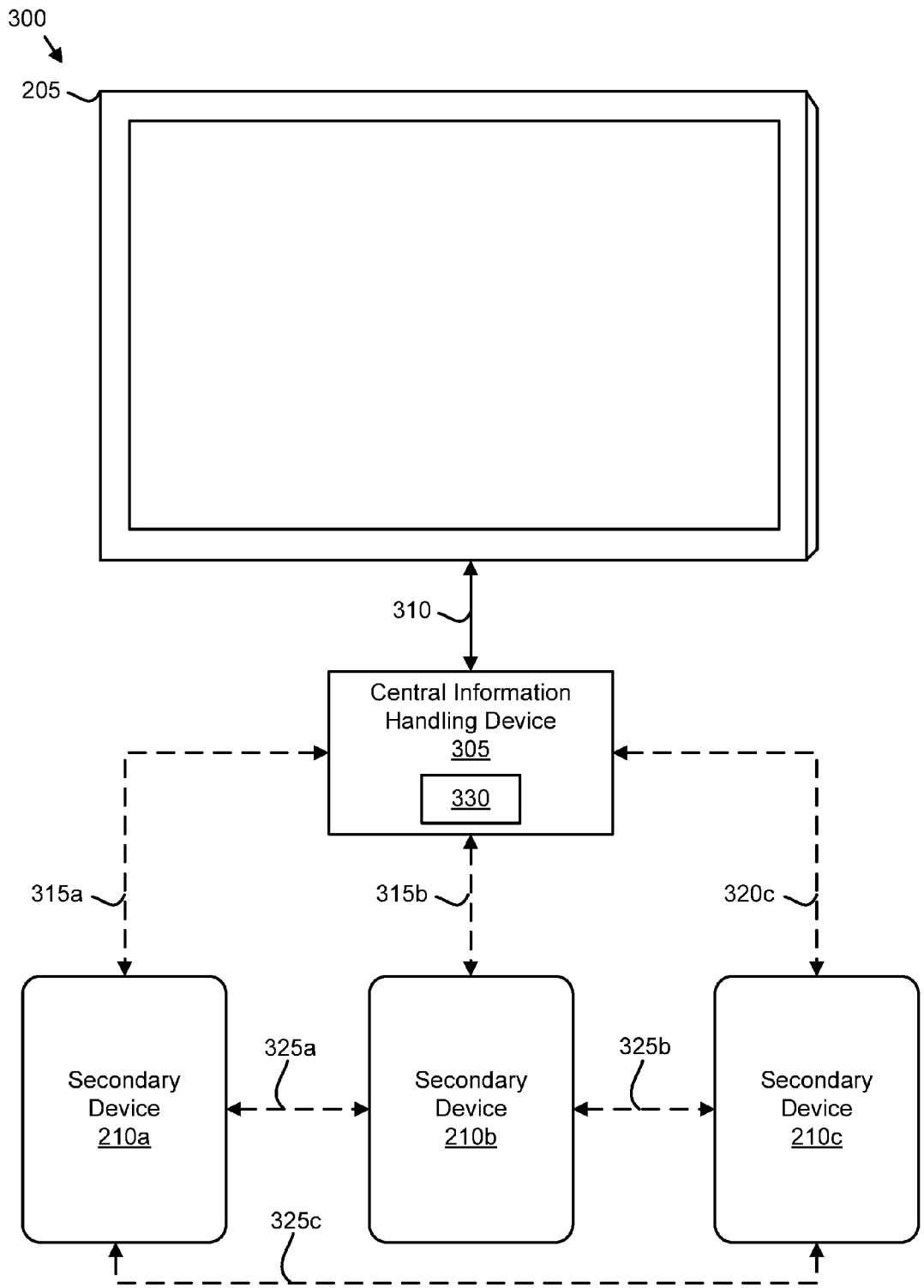
FIG. 3 is a schematic block diagram illustrating another embodiment of a system for a central display with private secondary displays.

FIG. 2 illustrates one embodiment of a system 200 for a central display 205 with private secondary displays 215. The system includes a central display 205 and a plurality of secondary devices 210. The central display 205 may be embodied as a Liquid Crystal Display ("LCD") screen, plasma screen, Cathode Ray Tube ("CRT") screen, a projector projecting an image, and the like. In one embodiment, the central display 205 is a touchscreen display receiving touch input from a user on the screen and/or on a separate touch sensitive area, such as a bezel of the screen, or the like. Referring to FIG. 3, in one embodiment, the central display 205 communicates 310 with and/or is controlled by a central information handling device 305. The central information handling device 305 may be integrated with the central display 205 in one embodiment. In another embodiment, the central information handling device 305 is separate from the central display 205. In some embodiments, the central information handling device 305 may include similar components to the computing system 100 depicted in FIG. 1 including memory and/or storage device storing computer readable programs with a processor that executes the computer readable programs as is well known to those skilled in the art. The central information handling device 305 may be embodied as a desktop computer, a portable computer, a server, a mainframe computer, computing device, logic hardware, and/or the like.

Referring back to FIG. 2, the secondary devices 210 are each depicted as handheld information handling devices. Moreover, each secondary device 210, in the depicted embodiment, includes an integrated display 215 (hereinafter a "secondary display"). In one embodiment, at least one secondary device 210 is a touchscreen device receiving touch input from a user on a touchscreen (e.g. as its secondary display 215) and/or on a separate touch sensitive area, such as a bezel of the screen, or the like. In other embodiments, a secondary device 210 may embodied separately from its secondary display 215 and communicate with the secondary display 215 over a wired and/or wireless connection.

A secondary device 210 may also be embodied as a desktop computer, a portable computer, a server, a mainframe computer, a handheld computing device, a personal desktop assistant ("PDA"), a tablet computer, a slate or pad computer, an e-Book reader, a mobile phone, a Smartphone, and the like. Furthermore, although FIG. 1 depicts three secondary devices 210, the system may include any suitable number of secondary devices 210. Furthermore, a secondary display 215 may be embodied as an LCD screen, a plasma screen, a projector projecting an image, and the like.

Referring to FIG. 3, each secondary device 210 may communicate 315 with the central display 205 directly and/or through the central information handling device 305 (as depicted). Furthermore, each secondary device 210 may communicate with each other directly 325 and/or through 315 the central information handling device 305. Each secondary information handling device and the central information handling device 305 may communicate through a wired connection and/or a wireless connection such as a wireless local area network ("WLAN") connection, PAN such as Bluetooth, WiFi Direct, WirelessHD, or WAN such as 3G, 4G, and the like.

In the depicted embodiment, the central information handling device 305 includes a display apparatus 330 that manages a central image for the central display 205 and secondary images for the secondary displays 215. Specifically, the display apparatus 330 may generate a central image on the central display 205 that is viewable concurrently by users of each secondary display 215. Furthermore, the display apparatus 330 may generate secondary images on each secondary display 215. The secondary images may be distinct from one another and from the central display 205, with different visual data. In one embodiment, each secondary image correlates with the central image. Specifically, each secondary image may be a continuation of the central image, be linked to the central image, display visual data sent from the central information handling device 305 that also has a visual component displayed on the central image, and the like as is described below.

Referring also to FIG. 2, the display apparatus 330 may generate a central image with central visual components 215 that are viewable by users of the secondary displays 215. In the depicted embodiment, the central visual components 215 are cards. The display apparatus 330 may generate secondary images with secondary visual components 225, 230, 235 on the secondary displays 215. In the depicted embodiment, the secondary visual components 225, 230, 235 are also cards. However, the cards 225, 230, 235 on each secondary display 215 are different that those on other secondary display 215 and those on the central display 205.

In some embodiments, the display apparatus 330 may provide an enhanced multi-player gaming experience. Specifically, certain games may include game pieces that are viewable by multiple players and game pieces that are private to each player, or private to a subset of the players. For example, in poker, players play around a table holding common cards, a pot with an amount of chips, and a pile of chips for each user. In addition, each user may hold private cards that other users cannot see. In one embodiment, the central display 205 may include the common cards, the pot, and each player's chips as central visual components 215. Each secondary device 210 may include cards for a specific player (e.g. a user of the secondary device) private to that player as secondary visual components 225, 230, 235 on the secondary displays 215.

In a further embodiment, the display apparatus 330 allows a user to send and receive input, at a secondary device 210, to/from the central display 205/central information handling device 305. For example, if a particular secondary device 210 is a touchscreen device, a user may use touch gestures on the touchscreen 215 to put chips into the common pot, discard, and the like. Furthermore, the central display 205 may also be a touchscreen and allow users to draw cards from the central display 205 (e.g. the central "table"), retrieve chips, and the like, using touch gestures. The poker embodiments are but some possible embodiments related to gaming in which a central display 205 viewable by multiple users may be combined with private secondary displays 215.

The display apparatus 330 may also provide enhanced educational environments, communication environments, and the like. For example, a classroom instructor may utilize the central display 205 for lecture notes viewable by multiple students and a student may maintain his/her individual notes, assignments, and the like on a secondary device 210. The teacher may send problems, documents, and the like to individual secondary devices 210 using touch gestures or other input on the central display 215. Likewise a student may send, from the student's secondary device 210, an assignment, answer to a problem, and the like to the central display 205/central information handling device 330 with a touch gesture (e.g. if the secondary device 215 is a touchscreen device) or other input.

In one embodiment, the display apparatus 330 resides on the central information handling device 305, as depicted. The display apparatus 330 may generate secondary images for the secondary devices 210 and send the secondary images to the secondary devices 210. In one embodiment, each secondary device 210 may execute an application that interfaces with the display apparatus 330 on the central information handling device 305. The display apparatus 330 may send a secondary image to a secondary device 210, received through the application executing on the secondary device 210. In an alternate embodiment, the display apparatus 330 may send instructions and/or data to a secondary device 210 such that the application on the secondary device 210 generates the secondary image based on the instructions/data.

Similarly, at least a portion of the display apparatus 330 may reside, in certain embodiments, on at least one secondary device 210, on both the central information handling device 305/central display 205 and at least one secondary device 210, an external server or computing device, and the like.

Figure 4:
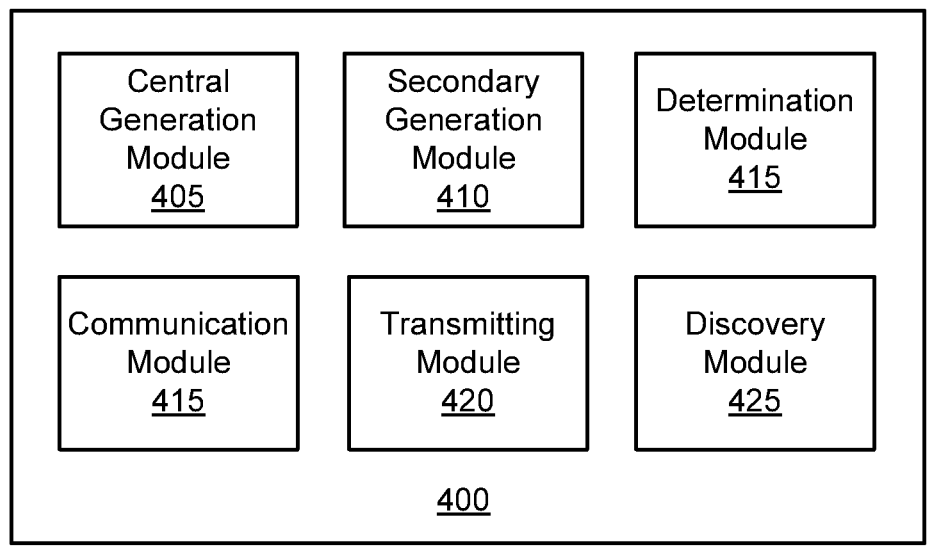
FIG. 4 is a schematic block diagram illustrating one embodiment of an apparatus for a central display with private secondary displays.

FIG. 4 is a schematic block diagram illustrating one embodiment of an apparatus 400 for a central display 205 with private secondary displays 215. The apparatus 400 may comprise one embodiment of the display apparatus 330 depicted in FIG. 3. The description of the apparatus 400 refers to elements of FIGS. 1-3, like numbers referring to like elements. The apparatus 400 includes one or more of a central generation module 405, a secondary generation module 410, a determination module 415, a communication module 420, a transmitting module 425, and a discovery module 430.

The central generation module 405 generates a central image for a central display 205. As described above, in one embodiment, the central display 205 is in communication with a central information handling device 305. The central information handling device 305 may be integrated with the central display 205 or separately embodied from the central display 205. In one embodiment, the central generation module 405 is embodied and/or comprises at least a portion of the central information handling device 305. The central information handling device 305 and/or central generation module 405 may be in communication with a plurality of secondary devices 210. Furthermore, as described above, each secondary device 210 may communicate with a distinct secondary display 215 (e.g. each secondary device has its own display).

Generating a central image may include, but is not limited to generating visual data and/or an image for transmission to the central display 205, modifying existing visual data and/or an existing image for the central display 205, and the like. The central generation module 405 may also interface with graphic and display components of the central information handling device 305 by working with an existing graphic module 120, and the like, to generate the central image. The central generation module 405 may generate the central image using any suitable process. The central generation module 405 may receive instructions to generate visual components and/or receive visual components for generation in the central image from applications (e.g. an application may specify that a certain visual component is to be included in the central image), a secondary device 210, the determination module 415 as described below, and the like. Furthermore, generating an image, as used herein, may include providing a static image, such as at a predefined interval, or providing a continuous image stream.

In one embodiment, the central information handling device 305 is a separate device from one or more of the secondary devices 210. Specifically, in one embodiment, the central information handling device 305 includes a first processor executing a first operating system and at least one secondary device 210 includes a second processor executing a second operating system other than the first operating system.

As stated above, in one embodiment, the central display 205 comprises a touch screen. The central display 205/central information handling device 305 may send data and/or visual components to one or more secondary devices in response to a touch gesture on the central display 205 touchscreen. For example, a card dealer may, using touch gestures on the central display 205, "deal" cards to a secondary display 215 by indicating that a visual component for a certain card on the central display is to move to the secondary display 215. The central display 205/central information handling device 305 may transmit data to the secondary display 215 and/or secondary information handling device 210 such that the visual component for the card appears on the secondary display 215.

The central display 205 may be viewable concurrently by users of each secondary display 215. In one embodiment, the central display 205 is embodied as a table such that a surface of the central display 205 is a surface of the table. In one embodiment, the central display 205 is substantially larger in comparison to each of the secondary displays 215.

The secondary generation module 410 generates a secondary image for two or more of the secondary displays 215. In one embodiment, the secondary generation module 410 generates a plurality of secondary images for a plurality of secondary devices 210. In a further embodiment, the secondary generation module 410 generates a distinct secondary image for each secondary display 215/secondary device 210.

In one embodiment, each secondary image correlates with the central image. Specifically, each secondary image may be a continuation of the central image, be linked to the central image, display visual data sent from the central information handling device 305 that also has a visual component displayed on the central image, and the like. In one embodiment, the central information handling device 305 combines each secondary display 215 into a common visual map and/or visual frame buffer. Consequently, a user may drag a visual component from one display to another (e.g. a user may drag a card 225a out of the top of the user's secondary display 215 and the card 225a appears in the central display 205 as if the visual area is one continuous space). In certain embodiments, the secondary generation module 410 treats each secondary display 215 as a separate visual entity from the central display 205. In addition, each secondary image and the central image may include different visual data.

Generating a secondary image may include, but is not limited to generating visual data and/or an image for transmission to one or more secondary displays 205, modifying existing visual data and/or an existing image for one or more secondary displays 205, and the like. The secondary generation module 410 may also interface with graphic and display components of one or more secondary devices 210 by working with an existing graphic module 120 in the secondary device(s) 210, and the like, to generate the central image. The secondary generation module 410 may generate the one or more secondary images using any suitable process.

In one embodiment, the secondary generation module 410 resides on the central information handling device 305. The secondary generation module 410 may transmit secondary images to the secondary devices 210 for display by the secondary devices without image generating logic on the secondary devices 210. In one embodiment, the secondary generation module 410 sends instructions (e.g. visual data and/or executable code to generate visual data) to a particular secondary device 210 and the particular secondary device 210 generates the secondary image based on the instructions.

In one embodiment, each secondary device 210 is substantially autonomous and may execute a secondary application in communication with the central information handling device 305. In a further embodiment, the secondary generation module 410 sends instructions to the one or more secondary devices 210 and the secondary application on each secondary device 210 generates the secondary image on each secondary device 210 based on the instructions. In one embodiment, a portion of the secondary generation module 410 resides on each secondary device 210 and generates a secondary image for a particular secondary device 210 on which each portion resides. In another embodiment, each secondary device 210 includes an instance of the secondary generation module 410 that generates a secondary image for a particular secondary device 210 on which each instance resides.

In one embodiment, at least one secondary device 210 is a touch device having a touch screen as a secondary display 215. In one embodiment, a particular secondary device 210 may communicate data to an additional secondary device 210 in response to the particular secondary device 210 detecting a predefined touch gesture on its secondary display 215. For example, in one embodiment, a user may move a visual component from a first secondary device 210 to be received by a user at a second secondary device 210.

The determination module 415 determines a destination for visual components, visual data, portions of visual images, and the like. Specifically, the determination module 415 determines whether a particular visual component is to be included in the central image generated by the central generation module 405 or in a secondary image generated by the secondary generation module 410 for one or more secondary devices 210 (and which secondary devices 210). The determination module 415 may determine to which image (central image or one or more secondary images) to send visual components, visual data, and the like based on instructions from an application that produces visual data (e.g. the poker game application), a location on a common visual map (e.g. is a user drags a card through the top of the user's secondary display 215 the determination module 415 may determine that the card appears on the central display 205, an instruction from the central information handling device 305 (e.g. a user on the central information handling device 305 designates a particular secondary device 210 to send a homework problem), and any other suitable method.

The communication module 420 receives data from a particular secondary device 210. As stated above, secondary devices 210, in one embodiment, may transmit data to the central information handling device 305. The data may be transmitted from the particular secondary device 210 in response to the particular secondary device 210 detecting a predefined input. In one embodiment, the predefined input is a touch gesture on the particular secondary device's 210 secondary display 215. In addition, the data may include a visual component. The central generation module 405 may display the visual component in the central image in response to the communication module 420 receiving data with a visual component from a particular secondary device 210.

The transmitting module 425 transmits the secondary image to each secondary device 210 for display on each secondary display 215. As stated above, in one embodiment, the secondary generation module 410 resides on the central information handling device 305. The transmitting module 425 may transmit secondary images to the secondary devices 210 for display by the secondary devices 210 without image generating logic located on the secondary devices 210.

The discovery module 430 discovers a particular secondary device 210 and associates the particular secondary device 210 with the central display 205/central information handling device 305 in response to discovering the secondary device 210. For example, the discovery module 430 may detect a particular secondary device 210 request to be associated with the central display 205/central information handling device 305. In one embodiment, the discovery module 430 associates a particular secondary device 210 after authenticating the particular secondary device 210.

Figure 5:
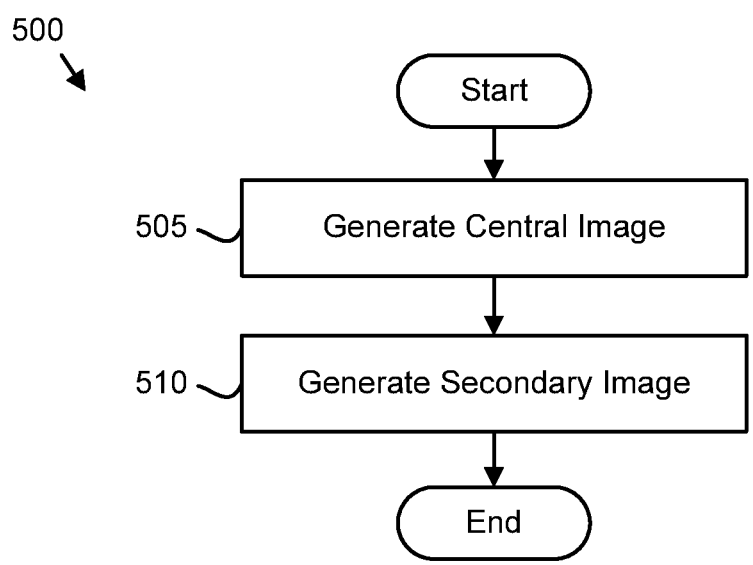
FIG. 5 is a schematic flow chart diagram illustrating one embodiment of a method for a central display with private secondary displays.

FIG. 5 illustrates one embodiment of a method 500 for a central display 205 with private secondary displays 215. The method 500 may implement at least a portion of the functions of the apparatus 500 of FIG. 4. The description of the method 500 refers to elements of FIGS. 1-4, like numbers referring to like elements.

The method 500 begins and the central generation module 405 generates 505 a central image for a central display 205, which is in communication with a central information handling device. Furthermore, the central information handling device 305 may be in communication with a plurality of secondary devices 210 communicating with a plurality of secondary displays 215. Each secondary device 210 communicates with a distinct secondary display 215. Next, the secondary generation module 410 generates 510 a secondary image for two or more of the secondary displays 215 of the secondary devices 210. The central display 205 is viewable concurrently by users of each secondary display 215. Then, the method 500 ends.

Figure 6:
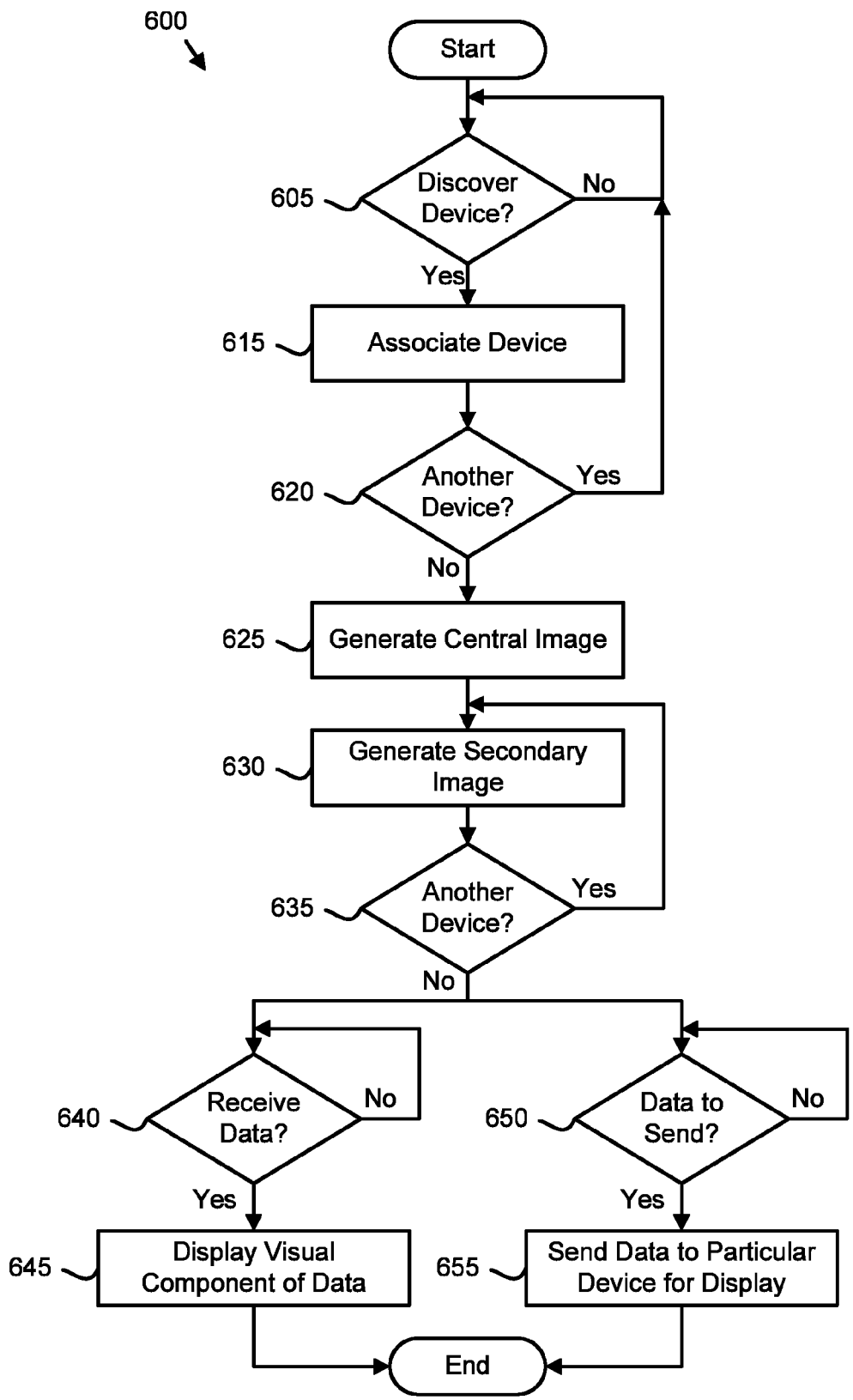
FIG. 6 is a detailed schematic flow chart diagram illustrating one embodiment of a method for a central display with private secondary displays.

FIG. 6 illustrates another embodiment of a method 600 for a central display 205 with private secondary displays 215. The method may implement at least a portion of functions of the apparatus 400 of FIG. 4. The description of the method 600 refers to elements of FIGS. 1-4, like numbers referring to like elements.

The method 600 begins and the discovery module 430 continually checks 605 for available undiscovered devices. For example, the discovery module 430 may receive requests from secondary devices 210 to associate with the central display 205/central information handling device 305. If the discovery module 430 discovers 605 a particular secondary device 210, the discovery module 430 then associates 615 the particular secondary device 210 with the central display 205, through, for example, a central information handling device 305 in communication with the central display 205. Associating may include adding a particular secondary display 215 to an overall image map, establishing communication, including communication of visual elements to/from the secondary display 215, and the like. If the discovery module 430 detects 620 another secondary device 210 for discovery, the method returns to step 605 and the discovery module 430 detects 605 the other secondary device 210.

Otherwise, the central generation module 405 generates a central image for the central display 205. The secondary generation module 410 generates a secondary image for a secondary display 215 of a particular secondary device 210. Although the step of discovering 605 a secondary device appears before the steps of generating 625 a central image and generating 630 secondary images, the step of discovering 605 a secondary device 210 may occur simultaneous to, and/or subsequent to generating 625 a central image and generating 630 secondary images.

The secondary generation module 410 determines 635 whether there is another secondary device 210. If the secondary generation module 410 determines 635 that there is another secondary device 210, the method repeats step 630, for each discovered secondary device 210, and the secondary generation module 410 generates a secondary image for a secondary display 215 of the other secondary device 210.

Otherwise the method proceeds to step 640, step 650, or both simultaneously. Specifically, referring to step 640, the communication module 420 monitors for data that includes a visual component from the secondary devices 210. If the communication module 420 receives 640 data with a visual component, the central generation module 405 displays 645 the visual component in the central image and the method 600 ends.

Referring to step 650, the communication module 420 monitors for data to send to the secondary devices 210. If the communication module 420 determines 650 there is data to send to a particular secondary device 210, including data with visual components, the communication module 420 sends 655 the data to the particular secondary device 210 and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a network component that communicates with a plurality of secondary devices over a data network, each secondary device communicating with a distinct secondary display, wherein at least one secondary device comprises a touch device having a secondary display comprising a touch screen;
    a processor;
    a memory that stores code executable by the processor to:
    generate a central image for a central display comprising a touch screen, the central display viewable concurrently by users of each secondary display;
    generate a common visual map associated with a plurality of secondary displays and containing visual data private to users of the secondary devices, the common visual map comprising a plurality of distinct secondary images for each secondary display,
        wherein each secondary display image includes visual data private to a user of the corresponding secondary device,
        wherein each secondary image is linked to the central image and comprises different visual data than the central image, and
        wherein visual data of each secondary image has a visual component displayed on the central image;
    discover an additional secondary device;
    associate the additional secondary device with the central display in response to discovering the additional secondary device;
    add an additional secondary display of the additional secondary device to the common visual map;
    generate a first visual component in the central image in response to receiving an instruction to generate the first visual component from a secondary device;
    send a second visual component to one or more of the plurality of secondary devices based on a location in the common visual map and in response to a touch gesture on the central display, the central image remaining distinct from each secondary image; and
    alter an image of a first secondary display of the common visual map in response to a touch gesture on a second secondary display of the common visual map by removing a visual component of an image of the second secondary display and generating the visual component in the image of the first secondary display.

2. The apparatus of claim 1, wherein the processor executes a first operating system, and wherein at least one secondary device comprising a second processor executing a second operating system other than the first operating system.

3. The apparatus of claim 1, wherein the network component transmits the secondary image to each secondary device for display on each secondary display.

4. The apparatus of claim 3, wherein the network component sends instructions to a particular secondary device, the particular secondary device generating the secondary image based on the instructions.

5. A method comprising:
    communicating with a plurality of secondary devices over data network, each secondary device communicating with a distinct secondary display, wherein at least one secondary device comprises a touch device having a secondary display comprising a touch screen;
    generating a central image for a central display, the central display comprising a touch screen in communication with a central information handling device, the central information handling device being in communication with the plurality of secondary devices;
    generating a common visual map associated with a plurality of secondary displays and containing visual data private to users of the secondary devices, the common visual map comprising a plurality of distinct secondary images for each secondary display,
        wherein each secondary display image includes visual data private to a user of the corresponding secondary device,
        wherein each secondary image is linked to the central image and comprises different visual data than the central image, and
        wherein visual data of each secondary image has a visual component displayed on the central image;
    discovering an additional secondary device;
    associating the additional secondary device with the central display in response to discovering the additional secondary device;
    adding an additional secondary display of the additional secondary device to the common visual map;

generating a first visual component in the central image in response to receiving an instruction to generate the first visual component from a secondary device;

sending a second visual component to one or more of the plurality of secondary devices based on location in the common visual map and in response to a touch gesture on the central display, the central image remaining distinct from each secondary image; and altering an image of a first secondary display of the common visual map in response to a touch gesture on a second secondary display of the common visual map by removing a visual component of an image of the second secondary display and generating the visual component in the image of the first secondary display.

6. The method of claim 5, wherein the plurality of secondary devices comprise touch devices, the method further comprising communicating data from a particular secondary device to an additional secondary device, the data being transmitted in response to the particular secondary device detecting a predefined touch gesture on its secondary display.

7. The method of claim 5, wherein the central information handling device comprises a first processor executing a first operating system, at least one secondary device comprising a second processor executing a second operating system other than the first operating system.

8. The method of claim 5, wherein generating the secondary image for each secondary display further comprises sending instructions to a particular secondary device, the particular secondary device generating the secondary image based on the instructions.

9. The method of claim 5, wherein the method further comprising transmitting the secondary image to each secondary device for display on each secondary display.

10. A computer program product comprising a storage device storing machine readable code executed by a processor to perform the operations of:

communicating with a plurality of secondary devices over data network, each secondary device communicating with a distinct secondary display, wherein at least one secondary device comprises a touch device having a secondary display comprising a touch screen;

generating a central image for a central display by way of a central generation module in communication with the central display, the central generation module comprising a touch screen in communication with the plurality of secondary devices;

generating a distinct secondary image for each secondary display, wherein each secondary display image includes visual data private to a user of the corresponding secondary device, wherein each secondary image is linked to the central image ands comprises different visual data than the central image, and wherein the visual data of each secondary image has a visual component displayed on the central image;

discovering an additional secondary device;

associating the additional secondary device with the central display in response to discovering the additional secondary device;

adding an additional secondary display of the additional secondary device to the common visual map;

generating a first visual component in the central image in response to receiving an instruction to generate the first visual component from a secondary device;

sending a second visual component to one or more of the plurality of secondary devices based on location in the common visual map and in response to a touch gesture on the central display, the central image remaining distinct from each secondary image; and altering an image of a first secondary display of the common visual map in response to a touch gesture on a second secondary display of the common visual map by removing a visual component of an image of the second secondary display and generating the visual component in the image of the first secondary display.

11. The computer program product of claim 10, wherein the plurality of secondary devices comprise touch devices, the processor to further perform the operations of: communicating data from a particular secondary device to an additional secondary device, the data being transmitted in response to the particular secondary device detecting a predefined touch gesture on its secondary display.

12. The computer program product of claim 10, wherein the central information handling device comprises a first processor executing a first operating system, at least one secondary device comprising a second processor executing a second operating system other than the first operating system.

13. The computer program product of claim 10, wherein generating the secondary image for each secondary display further comprises sending instructions to a particular secondary device, the particular secondary device generating the secondary image based on the instructions.

14. The computer program product of claim 10, the processor to further perform the operations of: transmitting the secondary image to each secondary device for display on each secondary display.

* * * * *